(12) United States Patent
Fujii et al.

(10) Patent No.: US 8,270,057 B2
(45) Date of Patent: Sep. 18, 2012

(54) OSCILLATOR DEVICE, OPTICAL DEFLECTING DEVICE AND METHOD OF CONTROLLING THE SAME

(75) Inventors: Kazunari Fujii, Kawasaki (JP); Suguru Miyagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 12/598,191

(22) PCT Filed: Jun. 16, 2008

(86) PCT No.: PCT/JP2008/061369
§ 371 (c)(1),
(2), (4) Date: Oct. 29, 2009

(87) PCT Pub. No.: WO2008/153221
PCT Pub. Date: Dec. 18, 2008

(65) Prior Publication Data
US 2010/0085618 A1    Apr. 8, 2010

(30) Foreign Application Priority Data
Jun. 14, 2007 (JP) .................................. 2007-157607

(51) Int. Cl.
*G02B 26/08* (2006.01)
(52) U.S. Cl. ...................................... 359/224.1; 359/904
(58) Field of Classification Search .... 359/199.1–199.4, 359/223.1–226.1, 871, 872, 904
See application file for complete search history.

(56) References Cited

U.S. PATENT DOCUMENTS

| | | | |
|---|---|---|---|
| 4,859,846 A | 8/1989 | Burrer | 250/234 |
| 7,376,161 B2 | 5/2008 | Fujii et al. | 372/21 |
| 2005/0128552 A1 | 6/2005 | Yasuda et al. | 359/223 |
| 2005/0162722 A1 | 7/2005 | Harris | 359/198 |
| 2006/0152785 A1 | 7/2006 | Yasuda et al. | 359/199 |
| 2006/0233208 A1* | 10/2006 | Takeda | 372/38.02 |
| 2007/0035799 A1* | 2/2007 | Gomi et al. | 359/214 |
| 2007/0052797 A1 | 3/2007 | Fujii et al. | 348/102 |
| 2009/0051992 A1 | 2/2009 | Fujii et al. | 359/199 |
| 2009/0067019 A1 | 3/2009 | Kato et al. | 359/198 |
| 2011/0019252 A1* | 1/2011 | Fujii et al. | 359/199.1 |

FOREIGN PATENT DOCUMENTS

| | | |
|---|---|---|
| EP | 1528422 | 5/2005 |
| JP | 2003-005123 | 1/2003 |
| JP | 2005-292627 | 10/2005 |
| JP | 2006-300981 | 11/2006 |
| WO | 2005/063613 | 7/2005 |
| WO | 2007/094489 | 8/2007 |

* cited by examiner

*Primary Examiner* — Jennifer L. Doak
(74) *Attorney, Agent, or Firm* — Fitzpatrick, Cella, Harper & Scinto

(57) ABSTRACT

An oscillator device including an oscillation system with oscillators and torsion springs, a driving member for driving the oscillation system, and a drive control member for supplying a driving signal to the driving member, the oscillation system having at least a first oscillation mode and a second oscillation mode, the second oscillation mode having an angular frequency approximately n-fold the angular frequency of the first oscillation mode where n is an integer, the driving member driving the oscillation system so that it simultaneously oscillates in the first and second oscillation modes, wherein a natural angular frequency calculating member calculates the natural angular frequency of the second oscillation mode based on an output signal from a photodetector, being outputted at a timing whereat the reflection light passes over the photodetector.

16 Claims, 11 Drawing Sheets

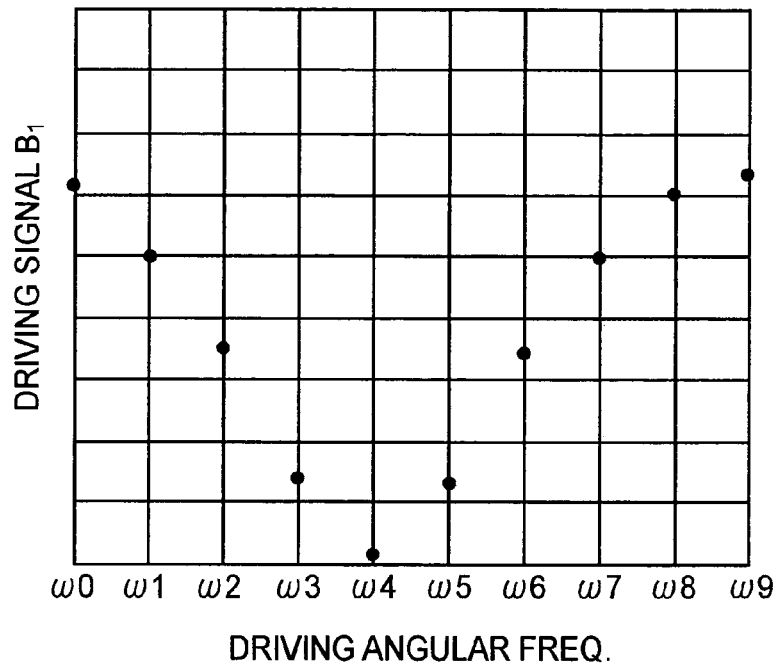
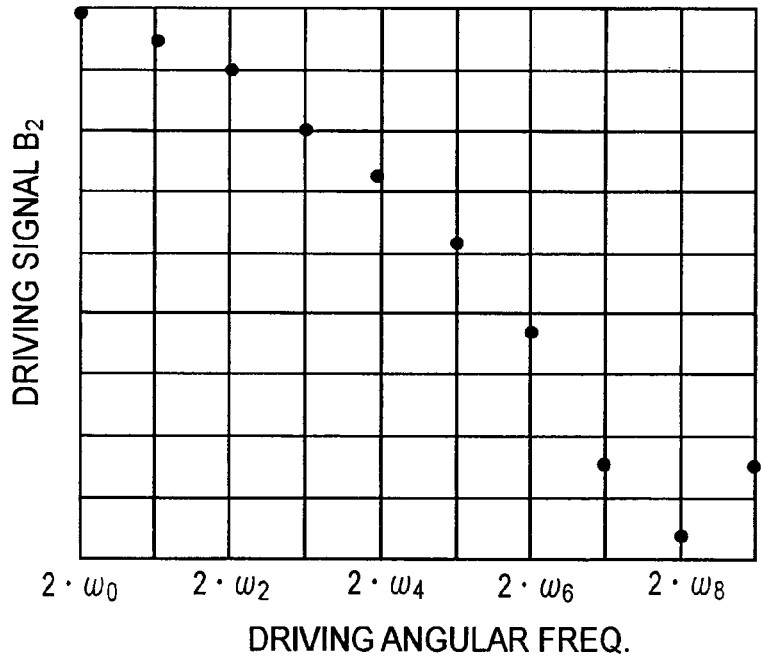

OSCILLATOR DEVICE, OPTICAL DEFLECTING DEVICE AND METHOD OF CONTROLLING THE SAME

TECHNICAL FIELD

This invention relates a technique associated with the field of oscillator devices having a plurality of oscillators and, more particularly, a technique suitable for optical deflecting devices. In another aspect, the invention concerns an image forming apparatus such as a laser beam printer, a digital copying machine or a scanning display unit using such optical deflecting device.

BACKGROUND ART

Resonance type optical deflecting devices proposed conventionally have the following features as compared with scanning optical systems using a rotary polygonal mirror such as a polygon mirror. That is, the optical deflecting device can be reduced in size considerably, the power consumption is slow, and theoretically there is no surface tilt of the mirror surface.

On the other hand, in the resonance type deflectors, since the deflection angle (displacement angle) of the mirror changes sinusoidally in principle, the angular speed is not constant. In order to correct this characteristic, techniques have been proposed in U.S. Pat. No. 4,859,846 and U.S. Patent Application Publication No. US2006/0152785.

In U.S. Pat. No. 4,859,846, a resonance type deflector having oscillation modes of a fundamental frequency and a frequency threefold the fundamental frequency is used to accomplish chopping-wave driving. FIG. 14 shows a micromirror which realizes approximately chopping-wave driving. An optical deflecting device 12 comprises oscillators 14 and 16, torsion springs 18 and 20, driving members 23 and 50, detecting members 15 and 32, and a control circuit 30. This micromirror has a fundamental resonance frequency and a resonance frequency approximately threefold the fundamental frequency. It drives based on a synthesized frequency of the fundamental frequency and the threefold frequency. As a result, the oscillator 14 having a mirror surface is driven by chopping-wave driving, and the deflection angle thereof realized optical deflection with less change of the angular speed as compared with sinusoidal driving. On this occasion, the oscillation of the oscillator 14 is detected by the detecting members 15 and 32, and a necessary driving signal for the chopping wave is generated by the control circuit 30. The micromirror is then driven by the driving members 23 and 50.

On the other hand, U.S. Patent Application Publication No. US2006/0152785 discloses a microoscillator in which a system comprised of a plurality of torsion springs and a plurality of movable elements has a plurality of separated natural oscillation modes. In this microoscillator, within the separate natural oscillation modes, there are a reference oscillation mode which is the natural oscillation mode of the reference frequency, and an even-number-multiple oscillation mode which is the natural oscillation mode of a frequency approximately n-fold the reference frequency where n is an even number. In U.S. Patent Application Publication No. US2006/0152785, the microoscillator is oscillated based on these oscillation modes, whereby sawtooth-wave driving is realized.

Furthermore, in Japanese Laid-Open Patent Application No. 2005-292627, in order to detect the scan position of a light beam deflected by a deflection mirror being driven based on a sinusoidal wave, the time moment whereat the light beam being scanningly deflected passes a predetermined position is detected by means of an optical sensor, whereby the deflection mirror is controlled using the time moment.

Although the oscillator devices of U.S. Pat. No. 4,859,846 and U.S. Patent Application Publication No. US2006/0152785 mentioned above have realized chopping-wave driving and sawtooth wave driving, since the resonance frequency of the oscillator is different due to the manufacturing error or operating environment, it is necessary to detect the resonance frequency of the oscillator at the time of driving.

The oscillation state of the oscillator can be detected by, as disclosed in Japanese Laid-Open Patent Application No. 2005-292627, providing a photodetector near the scan end of the light beam (scanning light) deflected by the oscillator device, and based on the timing when the scanning light passes this photodetector.

For example, if the resonance frequency of an oscillation system having a plurality of oscillation modes (a reference oscillation mode and an oscillation mode integral-multiple of the reference mode) such as disclosed in U.S. Pat. No. 4,859,846 and U.S. Patent Application Publication No. US2006/0152785 is going to be detected, the oscillator is driven with the respective oscillation modes and the state of oscillation of the oscillator at that time is detected.

If the state of oscillation is detected using a photodetector provided in the vicinity of the scan end, when the oscillator is driven based on the reference oscillation mode, the scan range of the scanning light can be comparatively broadened, such that the state of oscillation of the oscillator can be detected with the photodetector provided near the scan end.

However, when the oscillator was driven only by the oscillation mode of integral-number multiple, the scan range of the scanning light becomes narrower as compared with the case where it is driven by the reference oscillation mode. Therefore, it is difficult to detect the state of oscillation of the oscillator by use of the photodetector disposed near the scan end. Thus, it is difficult to detect the resonance frequency of the oscillation mode of the integral-number multiple of the oscillation system.

DISCLOSURE OF THE INVENTION

The problem to be solved by the present invention will now be explained in greater detail with reference to FIG. 13.

FIG. 13 illustrates a case where an oscillation system comprised of two oscillators is driven based on a first oscillation mode (reference oscillation mode) and a second oscillation mode (double oscillation mode) having a frequency twofold the frequency of the first oscillation mode. Here, the displacement angle of the oscillator can be expressed by $$\theta(t) = A_1 \sin \omega t + A_2 \sin(2\omega t + \varphi)$$

In FIG. 13, the oscillating motion in the reference oscillation mode can be expressed by $$\theta(t) = A_1 \sin \omega t$$

Also, the oscillating motion in the double oscillation mode can be expressed by $$\theta(t) = A_2 \sin(2\omega t + \varphi)$$

It is seen from the drawing that the maximum amplitude of the double oscillation mode is smaller than the maximum amplitude of the reference oscillation mode. Namely, if the photodetector is disposed at $\theta_1$ or $\theta_2$ in FIG. 13, in the double oscillation mode the maximum amplitude does not reach $\theta_1$ or $\theta_2$ such that the state of oscillation cannot be detected.

Hence, the present invention provides an oscillator device by which, even if it is used in an oscillator device such as described above, the natural angular frequency (resonance frequency) of the oscillation mode which is integral-number multiple of the reference oscillation mode can be detected.

More specifically, the present invention provides an oscillator device which is comprised of an oscillation system having a plurality of oscillation modes, by which the resonance frequency of the oscillation mode which is integral-number multiple of the reference frequency can be detected easily.

Here, the resonance frequency $f_r$ of the oscillation system and the natural angular frequency $\omega_r$ of the oscillation system have a relationship of $\omega_r = 2\pi f_r$. Although the specification will describe the detection of natural angular frequency $\omega_r$, detection of the resonance frequency $f_r$ and detection of the natural angular frequency $\omega_r$ are essentially the same.

In accordance with an aspect of the present invention, there is provided an oscillator device, comprising: an oscillation system having a plurality of oscillators and a plurality of torsion springs; a driving member configured to drive said oscillation system; a drive control member configured to supply a driving signal to said driving member; a photodetector configured to receive reflection light of a light beam incident on at least one of said plurality of oscillators; and a natural angular frequency calculating member configured to calculate a natural angular frequency of said oscillation system; wherein said oscillation system has at least a first oscillation mode and a second oscillation mode, the second oscillation mode having an angular frequency approximately n-fold the angular frequency of the first oscillation mode where n is an integer, wherein said driving member is configured to drive said oscillation system so that said oscillation system simultaneously oscillates in the first and second oscillation modes, and wherein said natural angular frequency calculating member calculates the natural angular frequency of the second oscillation mode based on an output signal from said photodetector, being outputted at a timing whereat the reflection light passes over said photodetector.

In accordance with another aspect of the present invention, there is provided a method of controlling an oscillator device which includes an oscillation system having a plurality of oscillators and a plurality of torsion springs, a driving member configured to drive the oscillation system, a drive control member configured to supply a driving signal to the driving member, a photodetector configured to receive reflection light of a light beam incident on at least one of the plurality of oscillators, and a natural angular frequency calculating member configured to calculate a natural angular frequency of the oscillation system, the oscillating system having a first oscillation mode with an angular frequency and a second oscillation mode with an angular frequency approximately N-fold the angular frequency of the first oscillation mode, where N is an integer, said method comprising: a first step for determining a driving angular frequency $\omega_i$ where i is the number of repetitions, for driving the oscillation system; a second step for driving the oscillation system with a driving angular frequency $\omega_i$ and a driving angular frequency $n \cdot \omega_i$ where n is an integer not less than 2; a third step for memorizing at least one of the driving angular frequency $\omega_i$ and the driving angular frequency $n \cdot \omega_i$ and information related to the oscillating motion of the oscillation system outputted from the photodetector; and a fourth step for repeating said first to third steps at least twice and for calculating a natural angular frequency of the second oscillation mode of the oscillation system on the basis of at least one of the driving angular frequency $\omega_i$ and the driving angular frequency $n \cdot \omega_i$ memorized at said third step as well as the information related to the oscillating motion of the oscillation system.

In accordance with the present invention, in an oscillator device comprised of an oscillation system having a plurality of oscillation modes, the natural angular frequency (resonance frequency) of the oscillation mode which is n-fold the reference frequency (n is an integer) can be detected quite easily.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5A and FIG. 5B are graphs for explaining the relationship between a driving angular frequency and a driving signal.

FIG. 7A and FIG. 7B illustrate the transmission characteristic for the deflection angle of the oscillator device of the present invention, wherein FIG. 7A is graph showing the relationship between the gain and the driving angular frequency, and FIG. 7B is a graph showing the relationship between the phase difference and the driving angular frequency.

BEST MODE FOR PRACTICING THE INVENTION

Preferred embodiments of the present invention will now be described with reference to the attached drawings.

Figure 1:
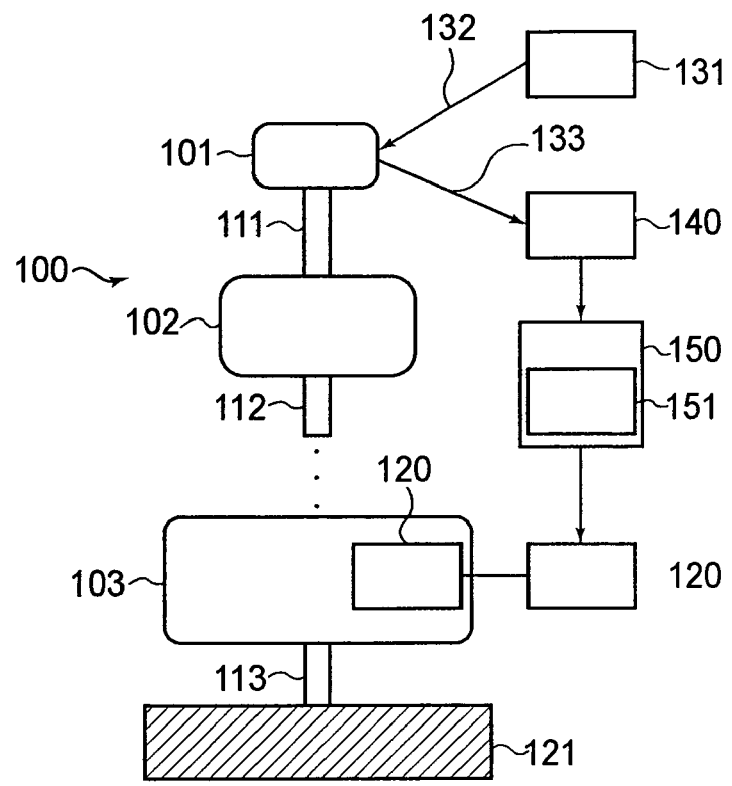
FIG. 1 is a block diagram of an oscillator device according to the present invention.

An oscillator device according to an embodiment of the present invention is comprised of a plurality of oscillators and a plurality of torsion springs as shown in FIG. 1. Specifically, the oscillator device of the present embodiment comprises an oscillation system 100 which includes at least a first oscillator 101, a second oscillator 102, a first torsion spring 111 and a second torsion spring 112, as well as a supporting member 121 for supporting the oscillation system.

The first torsion spring 111 connects the first oscillator 101 and the second oscillator 102 with each other. The second torsion spring 112 is connected to the second oscillator 102 so as to have its torsional axis aligned with the torsional axis of the first torsion spring 111. The oscillation system of the present embodiment should comprise at least two oscillators and two torsion springs. As shown in FIG. 1, for example, the oscillation system 100 may be constituted by three or more oscillators 103 and three or more torsion springs 113. Furthermore, the oscillation system 100 of the present embodiment may have a structure other than the cantilevered structure shown in FIG. 1, but rather it may comprise an oscillation system of a structure supported at opposite ends or an oscillation system of a combined structure of cantilevered structure and opposite-end-supported structure, as shown in U.S. Patent Application Publication US2006/0152785.

The principle of operation of the oscillator device according to the present invention is basically same as that of U.S. Patent Application Publication US2006/0152785.

Generally, the equation for free oscillation of an oscillation system having oscillators of a number n and torsion springs of a number n is given as follows.

$$M\ddot{\theta} + K\theta = 0 \tag{1}$$

$$\theta = \begin{pmatrix} \theta_1 \\ \theta_2 \\ \vdots \\ \theta_n \end{pmatrix},$$

$$M = \begin{pmatrix} I_1 & & & \\ & I_2 & & \\ & & \ddots & \\ & & & I_n \end{pmatrix},$$

$$K = \begin{pmatrix} k_1 & -k_1 & & & \\ -k_1 & k_1+k_2 & -k_2 & & \\ & & \ddots & & \\ & & & -k_{n-1} & k_{n-1}+k_n \end{pmatrix}$$

where $I_k$ is the inertial moment of the oscillator, $k_k$ is the spring constant of the torsion spring, $\theta_k$ is the torsion angle of the oscillator ($k=1, \ldots, n$). If the eigen value of $M^{-1}K$ of this system is denoted by $\lambda_k$ ($k=1$ to $n$), the angular frequency $\omega_k$ of the natural oscillation mode is given by $\omega_k = \sqrt{(\lambda_k)}$.

In the oscillator device of the present invention, an oscillation system including oscillators of a number n and torsion springs of a number n and having oscillation modes of a number n is configured so that, among these $\omega_k$ there are a fundamental frequency and frequencies of a number n−1 which are integral-number multiples of the fundamental frequency. This enables various motions of the oscillator. It should be noted that in this specification the term "integral-number multiple" includes an approximately integral-number multiple, and the approximately integral-number multiple refers to a numerical value range from 0.98 n-fold to 1.02 n-fold of the fundamental frequency, where n is an arbitrary integer.

Particularly, when the oscillator device of the present embodiment is constituted by two oscillators and two torsion springs and they are configured so that a fundamental frequency and a frequency approximately an even-number multiple of the fundamental frequency are included in the $\omega_k$, approximately constant angular-speed drive with suppressed drift of the angular speed of the oscillator in a predetermined range is realized.

Figure 12:
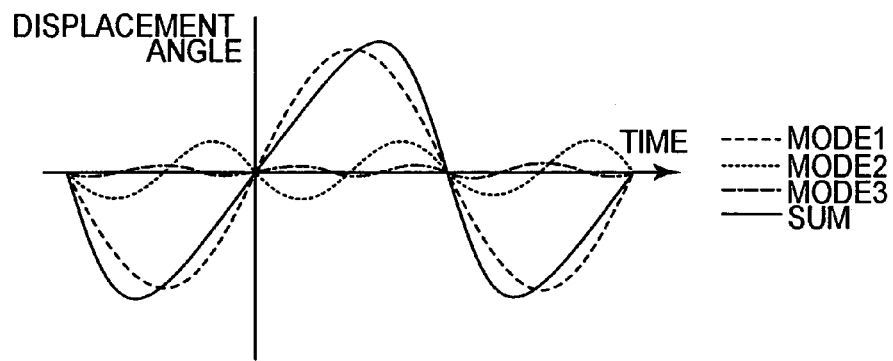
FIG. 12 is a graph showing the relationship between the displacement angle and time in a case where an oscillation system having three oscillation modes is oscillated.
Figure 13:
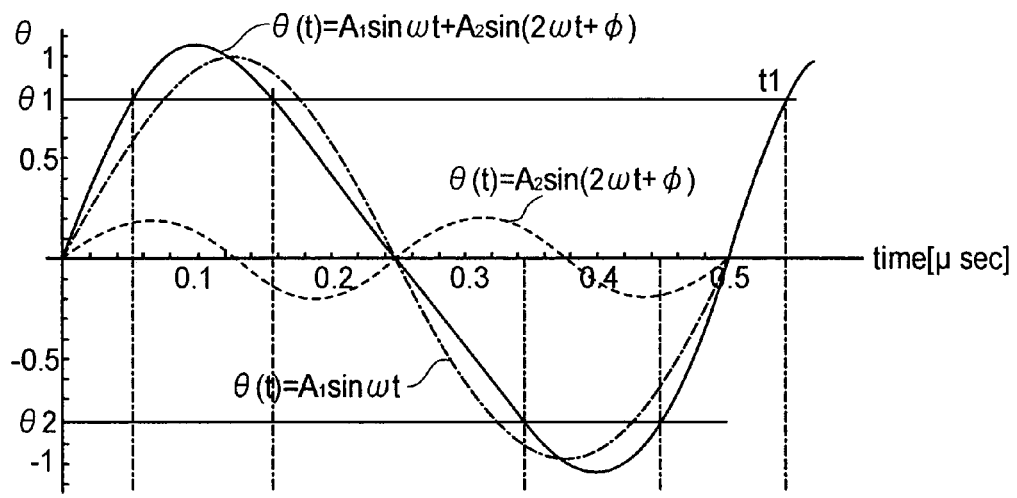
FIG. 13 is a graph showing the change with respect to time of the deflection angle of an oscillator device having a reference oscillation mode and an oscillation mode twofold the reference oscillation mode.
Figure 14:
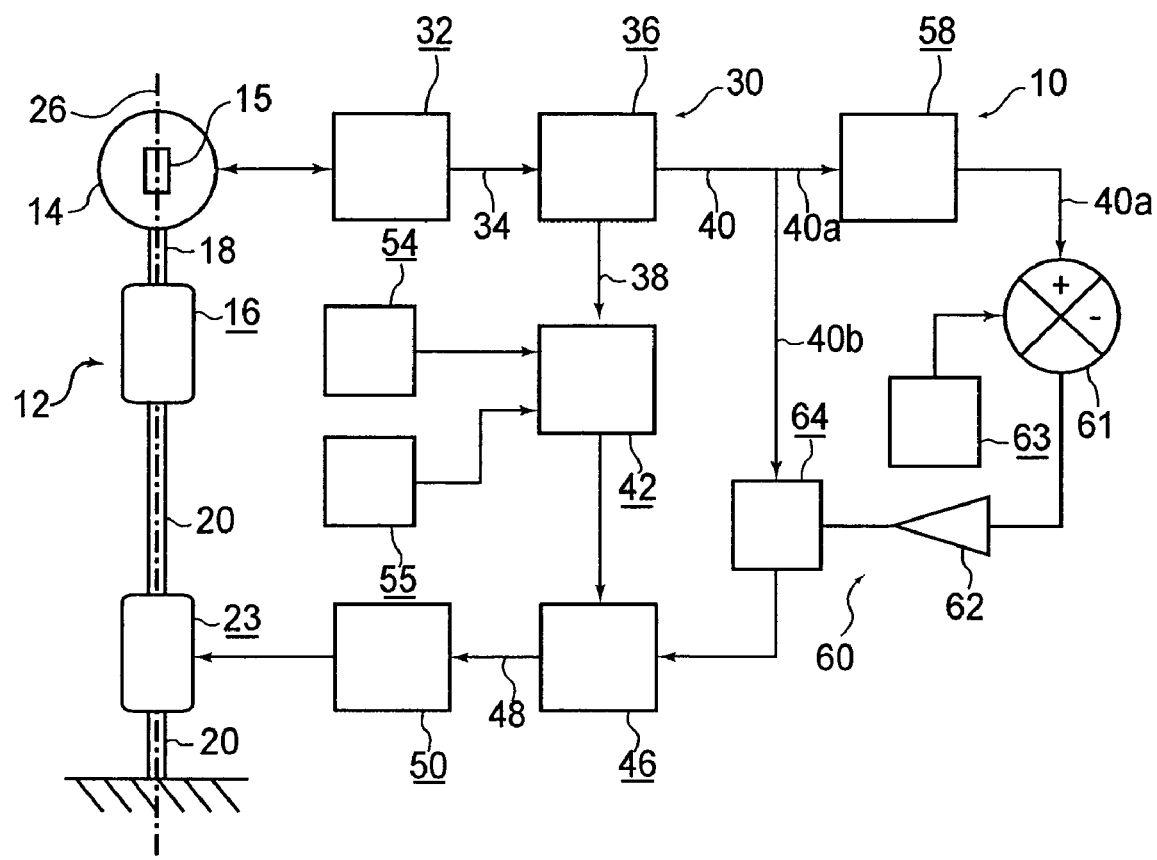
FIG. 14 is a block diagram of a conventional oscillator device.

Furthermore, if n=3, for example, since the oscillation system has three oscillators and three torsion springs, there are three oscillation modes provided. Then, the frequencies of the oscillation modes are arranged into a relationship of 1:2:3 and the oscillation system is excited by these oscillation modes simultaneously. This enables drive with smaller drift of angular speed, as compared with the case of n=2. FIG. 12 shows the relationship between the displacement angle of the oscillator and time when this oscillation system is driven if the frequencies of the oscillation modes are in a relation 1:2:3 and the amplitude ratio of these oscillation modes is 24:−6:1. The negative sign of the amplitude ratio means that the displacement from the origin to ½ period is negative, as in the mode 2 of FIG. 12.

By increasing the number of oscillation modes in this manner, the drift of the angular speed of the oscillator in a predetermined range can be made smaller.

When the oscillator device of the present embodiment is constituted by two oscillators and two torsion springs and is configured so that a fundamental frequency and a frequency approximately threefold the fundamental frequency are included in the $\omega_k$, approximately chopping-wave drive of the oscillator can be accomplished.

Next, the oscillation of an oscillation system comprised of oscillator of a number n and torsion springs of a number n, such as shown in FIG. 1, will be explained.

This oscillation system is so configured to produce, at the same time, oscillating motion moving at a fundamental frequency and oscillating motion moving at frequencies of a number n−1 and being an approximately integral-number multiple of the fundamental frequency.

Hence, in a first preferred form of the present embodiment, at least one of the oscillators is configured to provide oscillation that can be presented by an equation including the sum of a plurality of time functions. Here, the equation including the sum of the plurality of time functions includes an equation including a constant. For example, a case including the constant term may be a case in which a certain DC bias is applied to the driving member to shift the origin (the position of zero displacement-angle) of the displacement angle of the oscillator.

In a second preferred form of the present embodiment, the deflection angle θ of the optical deflecting device (here, the angle is measured with reference to the position of the scan center as shown in FIG. 3) is as follows. Now, the amplitude and driving angular frequency of the first oscillating motion are denoted by $A_1$ and ω, respectively, and the amplitude and driving angular frequency of the second oscillating motion are denoted by $A_2$ and nω (n is an integer not less than 2). Also, the relative phase difference of the first and the second oscillating motions is denoted by ø. Then, the motion of the oscillator is the oscillation that can be presented by an arithmetic expression which includes at least a term $A_1 \sin \omega t + A_2 \sin(n\omega t + \phi)$. Particularly, if n=2, it is expressed by an equation which includes a term $A_1 \sin \omega t + A_2 \sin(2\omega t + \phi)$. Thus, approximately constant angular-speed driving with suppressed drift of the angular speed of the oscillator, in a predetermined range, is realized.

In the case of n=3, it is expressed by a numerical formula which includes at least a term $A_1 \sin \omega t + A_2 \sin(3\omega t+ø)$. Thus, approximately chopping-wave drive of the oscillator is enabled. It should be noted that in this case as well the equation including at least a term $A_1 \sin \omega t + A_2 \sin(n\omega t+ø)$ may include an arithmetic expression including a constant term.

In a third preferred form of the present embodiment, if the amplitude and driving angular frequency of the first oscillating motion are denoted by $A_1$ and $\omega$, respectively, the amplitude and driving angular frequency of the n-th oscillating motion are denoted by $A_n$ and $n\omega$, respectively, and the relative phase difference of the first and the n-th oscillating motions is denoted by $ø_{n-1}$, the motion of the oscillator can be expressed as follows.

$$\theta(t) = A_1 \sin \omega t + \Sigma A_n \sin(n\omega t + ø_{n-1}) \quad (2)$$

Here, n is an integer number not less than 2. The value of n can be made as large as possible unless the number of oscillators constituting the oscillator device it can be enlarged. When the oscillator device is actually manufactured, n should preferably be around 2 to 5.

Figure 2:
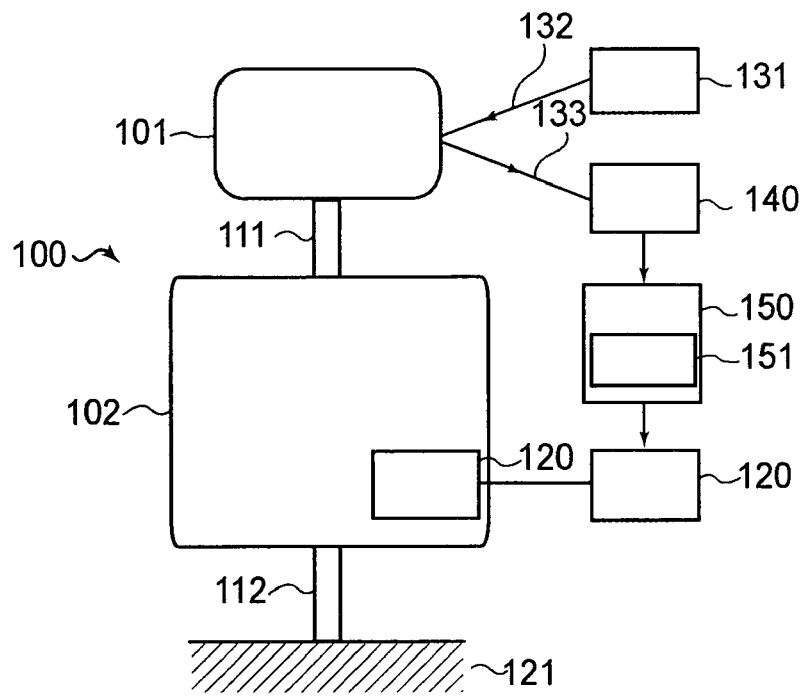
FIG. 2 is a block diagram of an oscillator device according to the present invention.

The light source 131, photodetector 140, drive control member 150, natural angular frequency calculating member 151 and driving member 120 of FIG. 1 are essentially the same as those of FIG. 2. Therefore, the following description will be made with reference to FIG. 2.

[Oscillation System]

The following description will be made on an example wherein, as shown in FIG. 2, the oscillation system is comprised two oscillators. However, the invention is similarly applicable to a case where the oscillation system is comprised of three oscillator or more.

The oscillator device of FIG. 2 comprises an oscillation system having a first oscillator 101, a second oscillator 102, a first torsion spring 111 and a second torsion spring 112, and a supporting member 121 for supporting the oscillation system. The first torsion spring 111 connects the first oscillator 101 and the second oscillator 102 each other. The second torsion spring 112 is connected to the second oscillator 102 so that it has a torsional axis aligned with the torsion axis of the first torsion spring 111. Furthermore, the oscillation system 100 of the present embodiment may have a structure other than the cantilevered structure shown in FIG. 2, but rather it may comprise an oscillation system of a structure supported at opposite ends or an oscillation system of a combined structure of cantilevered structure and opposite-end-supported structure, as shown in U.S. Patent Application Publication US2006/0152785.

Furthermore, when the oscillator device of the present embodiment is used as an optical deflecting device, a reflecting mirror may be formed on at least one oscillator. The reflecting mirror may be provided by forming a light reflecting film on the surface of the oscillator. If the surface of the oscillator is sufficiently smooth, it can be used as a reflecting mirror without such light reflecting film.

Furthermore, the oscillation system of the oscillator device of the present embodiment has at least a first oscillation mode and the second oscillation mode, and the frequency of the second oscillation mode is approximately n-fold (integral-number multiple of) the frequency of the first oscillation mode where n is an integer.

The oscillator device shown in FIG. 2 as well is driven so that at least one of the first and second oscillators produces oscillation that can be presented by an arithmetic expression which includes at least a term $A_1 \sin \omega t + A_2 \sin(n\omega t + ø)$ where n is an integer not less than 2 and $A_1 > A_2$.

Particularly, if the oscillation system comprised of two oscillators is driven in the first oscillation mode and the second oscillation mode having a frequency twofold the frequency of the first oscillation mode, the displacement angle of the oscillator can be expressed by the following equation.

$$\theta(t) = A_1 \sin \omega t + A_2 \sin(2\omega t + ø)$$

Figure 9:
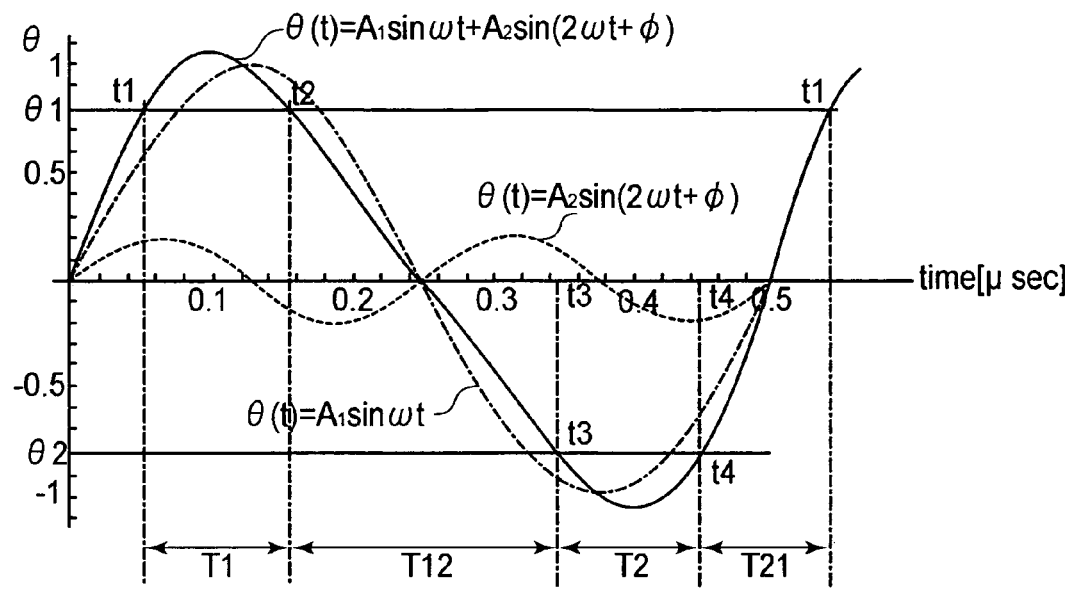
FIG. 9 is a graph showing the change with respect to time of the deflection angle of the oscillator device according to the present invention.

FIG. 9 illustrated changes of this displacement angle with respect to time. In FIG. 9, the oscillating motion in the reference oscillation mode can be presented by:

$$\theta(t) = A_1 \sin \omega t$$

The oscillating motion in the oscillation mode of a frequency twofold the reference oscillation mode can be presented by:

$$\theta(t) = A_2 \sin(2\omega t + ø)$$

[Driving Member]

The driving member 120 applies a driving force to the oscillation system so that the first and the second oscillators oscillate around a torsion axis.

The driving member 120 has a structure for applying a driving force to the oscillation system based on an electromagnetic system, electrostatic system or piezoelectric system. In the case of electromagnetic driving, for example, a permanent magnet may be provided on at least one oscillator, and an electric coil which applies a magnetic field to this permanent magnet may be disposed in the vicinities of the oscillator. Alternatively, the permanent magnet and the electric coil may be disposed reversely. In the case of electrostatic driving, an electrode may be formed on at least one oscillator, and an electrode effective to generate an electrostatic force between these electrodes may be formed in the vicinity of the oscillator. In the case of piezoelectric driving, a piezoelectric element may be provided on the oscillation system or the supporting member to apply the driving force.

[Photodetector]

The oscillator device according to the present invention further comprises a photodetector for receiving reflected light of a light beam incident on at least one of the first and the second oscillators. In the example of oscillator device of FIG. 2, the reflected light 133 of the light beam 132 incident on the oscillator 101 is received by a photodetector 140. Then, the state of oscillation of the oscillator 101 can be detected based on an output signal from this photodetector 140.

Figure 3A:
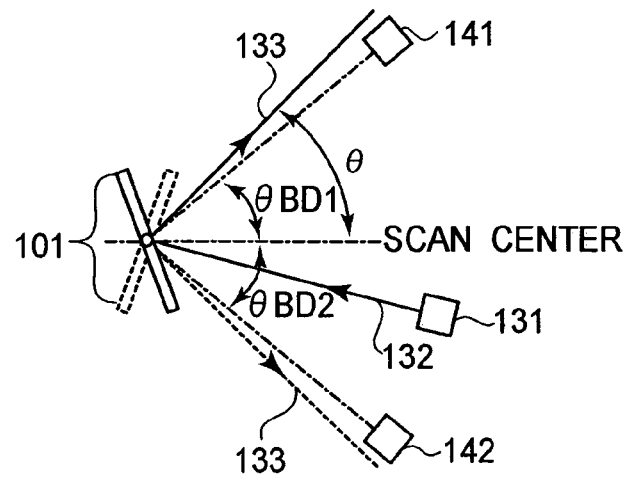
FIG. 3A through FIG. 3C are schematic views, respectively, for explaining the positional relationship between an oscillator device and a photodetector, according to the present invention.
Figure 3B:
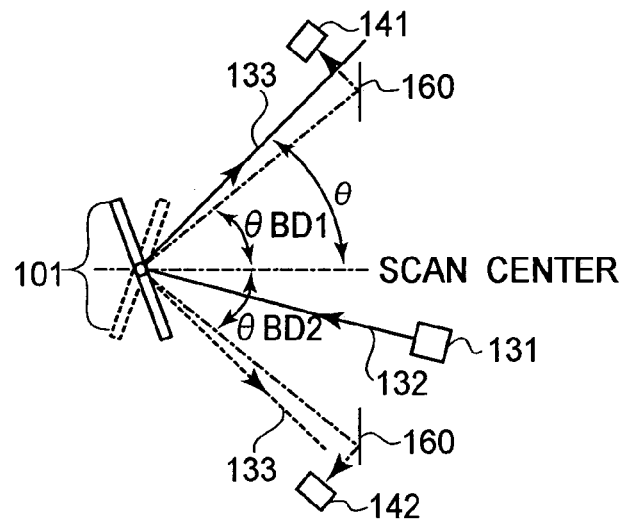
Figure 3C:
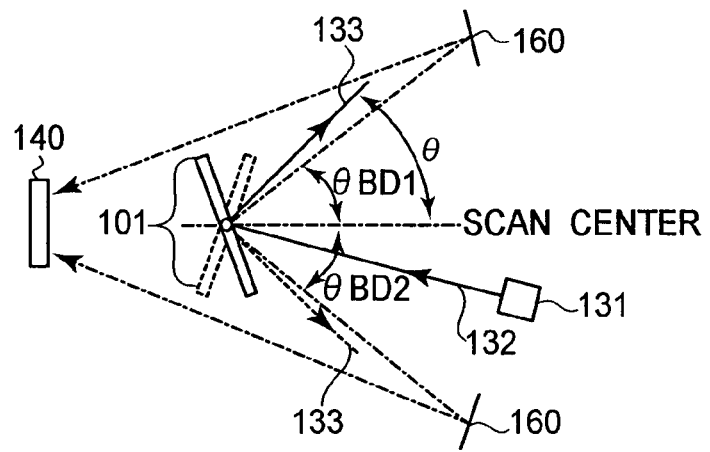

Furthermore, the photodetector 140 can be disposed such as shown in FIG. 3A, FIG. 3B or FIG. 3C. For example, as shown in FIG. 3A, first and second photodetectors 141 and 142 may be disposed at first and second displacement angles θBD1 and θBD2 adjacent the scan end.

Alternatively, as shown in FIG. 3B, reflection members 160 may be provided at the first and second displacement angles θBD1 and θBD2, respectively, and lights (reflected lights) from the respective reflection members 160 may be detected by the first and second photodetectors 141 and 142, respectively.

As a further alternative, as shown in FIG. 3C, reflection members 160 may be provided at the first and second displacement angles θBD1 and θBD2 and lights (reflected lights) from the respective reflection members 160 may be detected by a single photodetector 140. In this case, as shown in FIG. 3C, the photodetector may be provided at one side of the oscillator remote from the light source, or it may be disposed at the same side as the light source.

Namely, the first photodetector may be disposed at the irradiation position of the scanning light when the oscillator takes the first displacement angle, and the second photodetector may be disposed at the irradiation position of the scanning light when the oscillator takes the second displacement angle. The first and second photodetectors may comprise different elements or, alternatively, they may comprise the same element. Furthermore, the scanning light may be directly incident on the light detecting element or, alternatively, reflection light may be incident on the photodetector by way of at least one reflection member. In short, at least one photodetector should be disposed to receive and detect the scanning light at the first and second displacement angles.

Furthermore, as shown in FIGS. 3A-3C, if the scan center (in stationary state) is taken as zero and the absolute value of maximum scan angle (maximum deflection angle) 133 is denoted by 1, preferably the photodetector 142 should be disposed in the absolute value range of scan angle not less than 0.6 and not greater than 1.0. Particularly, the photodetector should preferably be disposed around 0.8.

[Drive Control Member]

The drive control member 150 of FIG. 2 supplies a driving signal to the driving member 120 to oscillate the oscillation system 100.

Figure 6A:
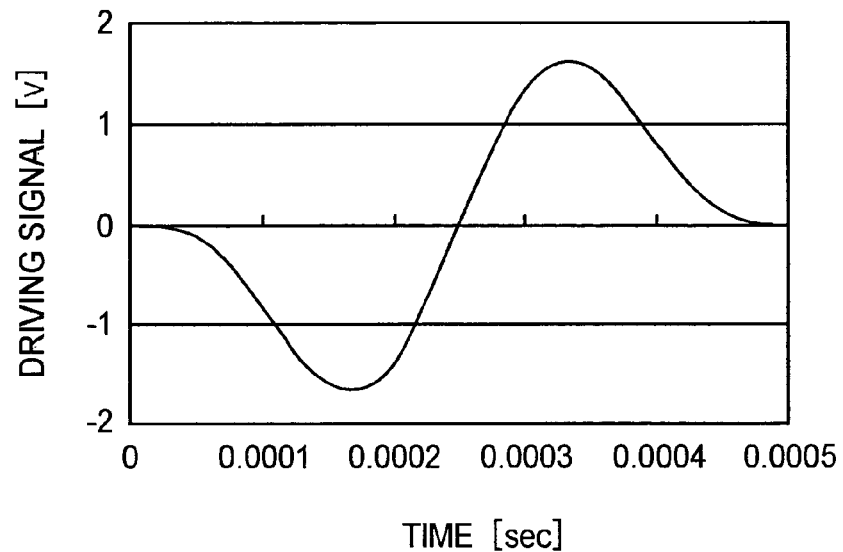
FIG. 6A and FIG. 6B are graphs for explaining an example of driving signal for driving the oscillator device according to the present invention.
Figure 6B:
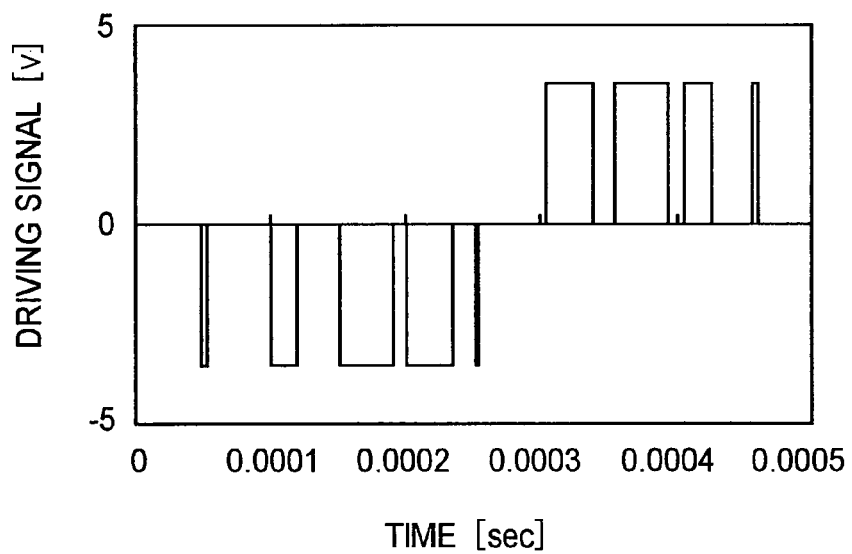

The driving signal may be a driving signal based on synthesizing sinusoidal waves (FIG. 6A), for example, or it may be a pulse-shaped driving signal (FIG. 6B). In the case of a driving signal based on combined sinusoidal waves, a desired driving signal can be obtained by adjusting the amplitude and phase of the sinusoidal waves. If the pulse-shaped signal is used for the driving, a desired driving signal can be generated by changing the pulse number, pulse spacing and pulse width with respect to time. In addition, any driving signal may be used provided that it can be drive to provide a desired deflection angle of the optical deflecting device.

Figure 7A:
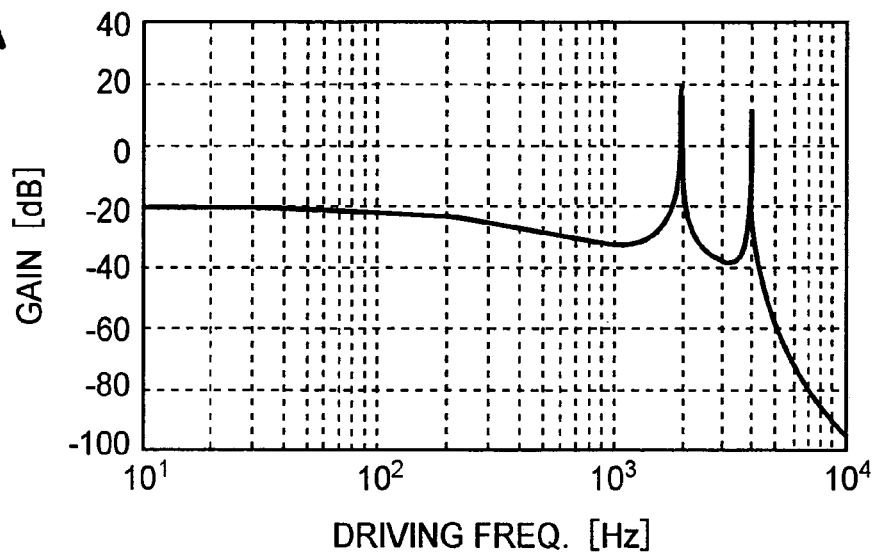
Figure 7B:
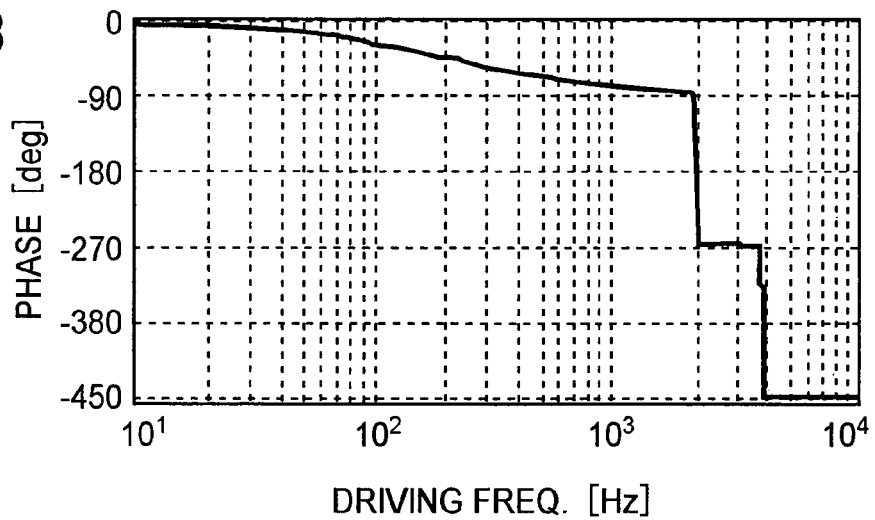

FIG. 7A and FIG. 7B illustrate the transfer characteristic of the displacement angle of the oscillator 101 when a voltage is applied to the electric coil. FIG. 7A illustrates the relationship between the gain (displacement angle/applied voltage) and the driving angular frequency. FIG. 7B illustrates the relationship of the applied voltage, the phase difference of the displacement angle and the driving angular frequency. As shown in FIG. 7A, the oscillator has two natural angular frequencies (resonance frequencies), and the gain (efficiency) of the oscillation mode $\omega_2$ to the oscillation mode $\omega_1$ is different. As shown in FIG. 7B, the phase of the oscillation mode of $\omega_2$ has a delay of about 180 deg. with respect to the oscillation mode $\omega_1$.

In this embodiment, such driving signal is supplied to the driving member 120 that causes oscillation of at least one of plural oscillators which oscillation can be expressed by an equation including the sum of a plurality of time functions. For generation of the driving signal, the driving angular frequency is determined based on the natural angular frequency detected by the natural angular frequency calculating member 151. Furthermore, the drive control member 150 generates a driving signal causing at least one of the amplitude and phase of the plural time functions, depicting the oscillation of the oscillator, to reach a predetermined value, on the basis of the output signal from the photodetector 140.

Furthermore, in this embodiment, such driving signal may be supplied to the driving member 120 that causes oscillating motion of the oscillator as presented by an arithmetic expression which includes at least a term $\theta(t)=A_1 \sin \omega t+A_2 \sin (n\omega t+\emptyset)$. In that case as well, the driving angular frequency may be determined based on the natural angular frequency detected by the natural angular frequency calculating member 151. The drive control member 150 controls the driving member 120 based on the output signal of the photodetector, so that at least one of $A_1$, $A_2$ and $\emptyset$ reaches a predetermined value.

Furthermore, in this embodiment, such driving signal may be supplied to the driving member 120 that causes oscillating motion of the oscillator as presented by equation (2). In that case as well, the driving angular frequency may be determined based on the natural angular frequency detected by the natural angular frequency calculating member 151. The drive control member 153 controls the driving member 120 based on the output signal of the photodetector, so that at least one of $A_1, A_2 \ldots A_n, \emptyset_1, \emptyset_2 \ldots \emptyset_{n-1}$ reaches a predetermined value.

Furthermore, in an specific example of the driving signal of the oscillator device according to the present invention, having an oscillation mode of a reference frequency and an oscillation mode of a frequency integral-number multiple of the reference frequency, is $$F(t)=B_1 \sin \omega t+B_2 \sin(n\omega t+\psi)$$

where n is an integer not less than 2. The drive control member 150 determines the values of $\omega$ and $n\omega$ based on the natural angular frequency detected by the natural angular frequency calculating member 151. Then, the information of the state of oscillation of the oscillator is obtained from the output signal of the photodetector 140, and the drive control member 150 adjusts $B_1$ and $B_2$ which are amplitude components of the driving signal and $\psi$ which is the phase component thereof. By setting these parameters at appropriate values, the displacement angle of the oscillator can be controlled to a desired value.

The output signal from the photodetector typically contains first time moment information (time entry) and second time moment information, different from each other, when the oscillator takes the first displacement angle, as well as third time moment information and fourth time moment information different from each other, when the oscillator takes the second displacement angle.

[Natural Angular Frequency Calculating Member]

The natural angular frequency calculating member 151 of FIG. 2 calculates the natural angular frequency of the oscillation system 100.

When the driving member is going to drive and oscillate the oscillation system in the first and second oscillation modes simultaneously, the natural angular frequency calculating member calculates the natural angular frequency of the second oscillation mode based on the output signal of the photodetector 140 as outputted at the timing when the reflected light passes over the photodetector.

Figure 11:
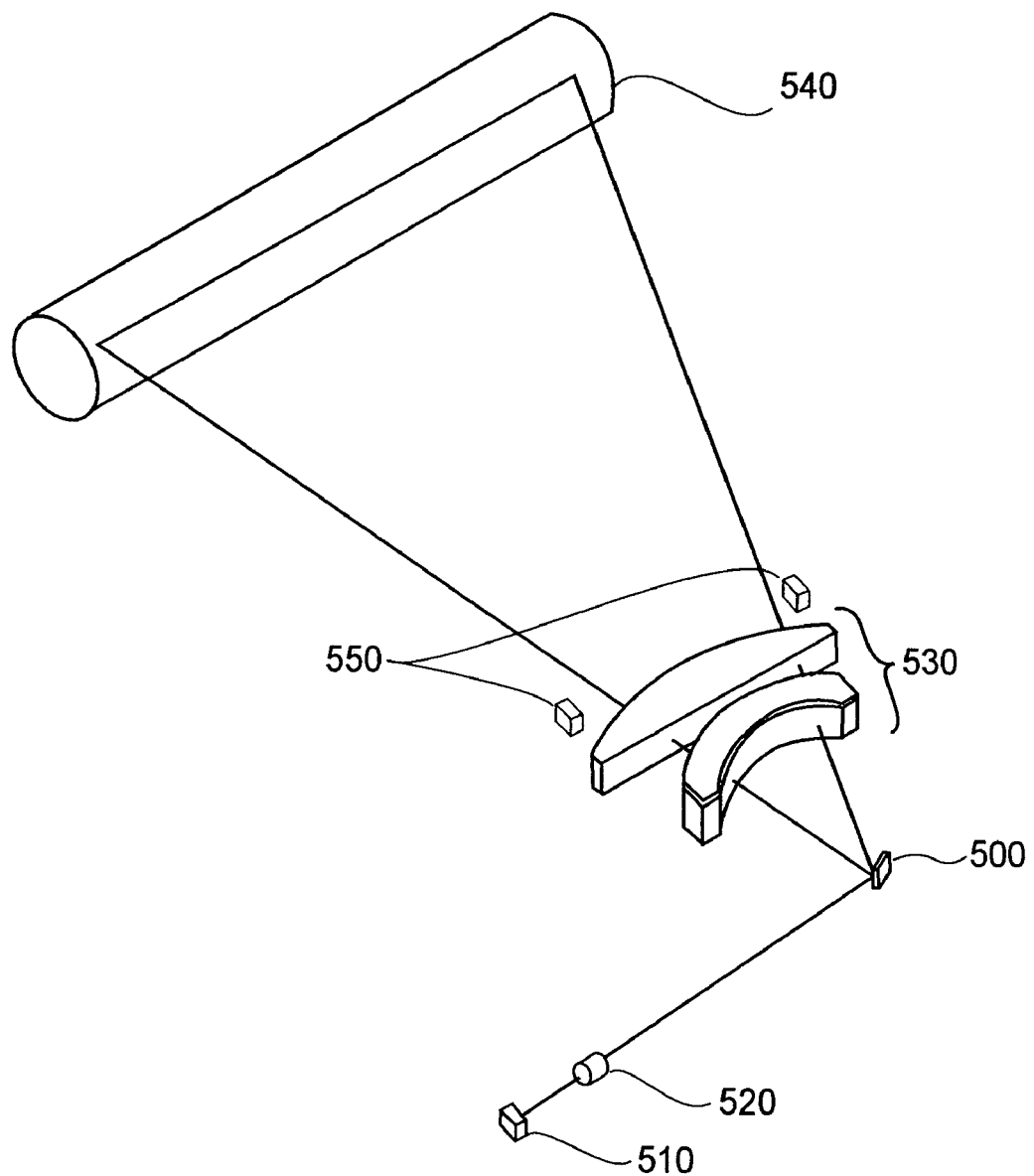
FIG. 11 is a schematic view for explaining an image forming apparatus according to the present invention.

In the oscillator device having two oscillation modes as in the present embodiment, it has at least a first oscillation mode for driving at a reference frequency and a second oscillation mode for drive at a frequency integral-number multiple of the reference frequency. If as shown in FIG. 9 the oscillator device of the present embodiment is driven only by the second oscillation mode, the amplitude is smaller as compared with a case where it is driven only by the first oscillation mode. Therefore, if the photodetector 141 is disposed at the position shown in FIG. 3, the photodetector 141 does not receive reflected light from the oscillator, such that the natural angular frequency of the second oscillation mode of the oscillation system cannot be detected any more. Particularly, if the oscillator device according to the present embodiment is used as an optical deflecting device of an image forming apparatus, as shown in FIG. 11, the photodetector 550 cannot be installed in the image drawing region.

In consideration of this, in the oscillator device of the present embodiment, in order to detect the natural angular frequency of the second oscillation mode, the oscillation system is driven to oscillate at the first oscillation mode and the second oscillation mode simultaneously, and the natural angular frequency of the second oscillation mode is calculated based on the signal of the photodetector provided at that time.

By exciting the first oscillation mode and the second oscillation mode at the same time as described above, an amplitude not obtainable only by the second oscillation mode can be obtained, and the natural angular frequency of the second oscillation mode (second resonance frequency) can be measured easily. Furthermore, by exciting the first oscillation mode and the second oscillation mode at the same time, the natural angular frequency of the first oscillation mode (first resonance frequency) as well can be measured at the same time.

Furthermore, the natural angular frequency calculating member is able to determine the natural angular frequency of the oscillation system, on the basis of first time moment information (time entry) and second time moment information different from each other as the oscillator takes a first displacement angle, and third time moment information and fourth time moment information different from each other as the oscillator takes a second displacement angle. Specifically, the natural angular frequency can be determined based on four time entries T1, T2, T3 and T4 shown in FIG. 9.

[Flow of Natural Angular Frequency Calculation]

In the oscillator device according to the present embodiment, the natural angular frequency can be detected in accordance with the following procedure.

First of all, the driving angular frequency $\omega_i$ (i is the number of repetitions) is determined (first step). Preferably, this driving angular frequency should be an angular frequency around the natural angular frequency of the first oscillation mode that the oscillation system has.

Next, the oscillation system is driven at a driving angular frequency $\omega_i$ and a driving angular frequency $n \cdot \omega_i$ at the same time, where n is an integer not less than 2 (second step).

With regard to the driving signal here, any driving signal is usable provided that it causes oscillation of the oscillator as can be expressed by an arithmetic expression which includes at least a term $A_{1i} \sin \omega_i t + A_{2i} \sin(n\omega_i t + \phi_i)$. For example, by supplying a driving signal of $B_{1i} \sin \omega_i t + B_{2i} \sin(n\omega_i t + \psi_i)$ to the oscillation system, the oscillator can be driven to produce the aforementioned oscillation.

Alternatively, the driving signal $B_{1i}$, $B_{2i}$ and $\psi_i$ may be adjusted so that $A_{1i}$, $A_{2i}$ and $\omega_i$ which are parameters of the equation presenting the oscillation of the oscillator take a predetermined value.

The driving signal may be a driving signal based on synthesizing sinusoidal waves, for example, or it may be a pulse-shaped driving signal. If the pulse-shaped signal is, a desired driving signal can be generated by changing the pulse number, pulse spacing and pulse width with respect to time. In addition, any driving signal may be used provided that it can be drive to provide a desired deflection angle of the optical deflecting device.

It should be noted that, in this step, before driving the oscillation system at the driving angular frequency $\omega_i$ and the driving angular frequency $n \cdot \omega_i$ at the same time, a process for driving the oscillation system only at the driving angular frequency $\omega_i$ may be carried out.

With regard to the driving signal here, any driving signal is usable provided that it causes oscillation of the oscillator as can be expressed by an arithmetic expression which includes a term $A_{1i} \sin \omega_i t$. For example, by supplying a driving signal of $B_{1i} \sin \omega_i t$ to the oscillation system, the oscillator can be driven to produce the aforementioned oscillation. In addition, any driving signal may be used provided that it can be drive to provide a desired deflection angle of the optical deflecting device.

By driving the oscillation system based on $\omega_i$ and $n \cdot \omega_i$, the reflected light from the oscillator can be incident on the photodetector and thus an output signal is output from the photodetector to the natural angular frequency calculating member at the timing when the reflected light passes over the photodetector.

Next, at least one of the driving angular frequency $\omega_i$ and the driving angular frequency $n \cdot \omega_i$ as well as the information related to the oscillating motion of the oscillation system are stored (third step).

In this process, $\omega_i$ and $n \cdot \omega_i$ as well as the information about the oscillating motion of the oscillation system when it is driven by these frequencies are memorized. The information related to the oscillation may be timing information for the moment whereat the scanning light to be detected by the photodetector passes over, and, as an example, it may be four pieces of time entry information t1, t2, t3 and t4 shown in FIG. 9.

Furthermore, with regard to the information related to the oscillation of the oscillator, values of $B_{1i}$, $B_{2i}$ and $\psi_i$ which are parameters of the driving signal may be memorized.

Subsequently, the first to third steps described above are repeated at least twice. Then, the natural angular frequency of the second oscillation mode of the oscillation system in the torsion axial direction is calculated from the information related to the oscillating motion of the oscillation system and at least one of the driving angular frequency $\omega_i$ and the driving angular frequency $n \cdot \omega_i$ memorized at the third step (fourth step).

More specifically, in this step, from the information based on the repetitions stored at the third step by the natural angular frequency calculating member, the natural angular frequency is calculated.

With regard to the method of detecting the natural angular frequency using the output signal from the photodetector (e.g., timing information t1, t2, t3 and t4 shown in FIG. 9), there is a method such as described below. Here, an example of n=2 will be explained.

Figure 10:
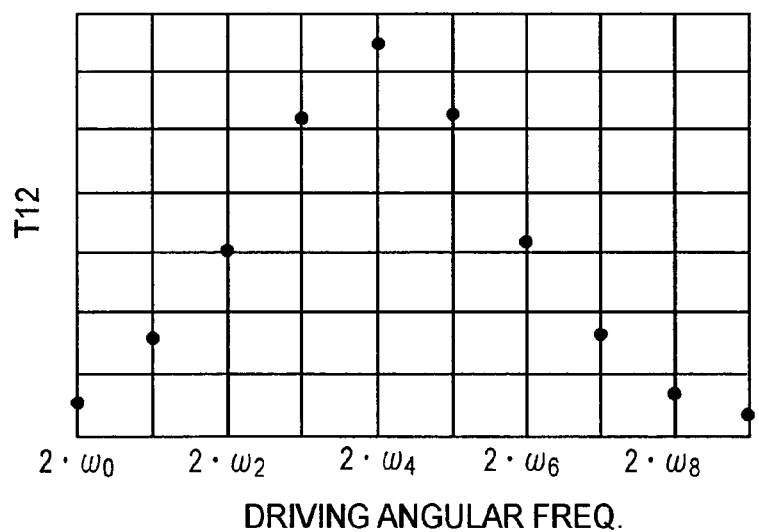
FIG. 10 is a graph illustrating the relationship between the driving angular frequency and the time interval $T_{12}$ detected by a photodetector.

If oscillator oscillates in accordance with $\theta(t) = A_{1i} \sin \omega_i t + A_{2i} \sin(n\omega_i t + \phi_i)$ ($\phi_i = 0$), for example, it is assumed that as shown in FIG. 10 the axis of abscissas is taken for the driving angular frequency ($2 \cdot \omega_i$) and the axis of ordinate is taken for the time T12 to be detected by the photodetector (namely, t3−t2). Then, the value of T12 as well changes with the change of the driving angular frequency $\omega_i$. Here, the value of T12 is the difference between the time moment t3 and the time moment t2, and in the oscillator device of the present invention the value of T12 becomes larger as the frequency becomes closer to the natural angular frequency. More specifically, since T12 tends to become large if the value of A2 which is the amplitude component of the optical deflector is large, the point where T12 shows a maximum provides the natural angular frequency (resonance frequency).

Similarly, the natural angular frequency can be detected by using T21 (t1-t4). The value of T21 becomes smaller as the driving angular frequency nears the natural angular frequency of the oscillation system. When the driving angular frequency becomes equal to the natural angular frequency of the oscillation system, the value of T21 reaches a minimum. Namely, the value of the driving angular frequency when the value of T21 is minimized is the natural angular frequency.

Although in this embodiment the natural angular frequency is calculated based on the time of T12, any other timing information outputted by the photodetector may be used.

Furthermore, if $A_{1i}$, $A_{2i}$ and $ø_i$ which are parameters of the equation presenting the oscillation of the oscillator are constant, the following is an example of a method of detecting the natural angular frequency of the oscillation system in the torsion axial direction using the values of $B_{1i}$, $B_{2i}$ and $\psi_i$ which are parameters of the driving signal.

As shown in FIG. 5A, the axis of abscissas denotes the driving angular frequency ($\omega_i$) and the axis of ordinate denotes $B_{1i}$ which is the parameter of the amplitude component of the driving signal. This $B_{1i}$ is the amplitude component at the lower-frequency side of $B_{1i} \sin \omega_i t + B_{2i} \sin(2\omega_i t + \psi_i)$ which is a driving signal, and the smaller the value of $B_{1i}$ is, the smaller the value of the driving force to be applied to the oscillation system is. Here, the closer the driving angular frequency of the oscillation system to the natural angular frequency is, the smaller the required driving force for driving the oscillation system is. Thus, the driving angular frequency with which the value of $B_{1i}$ is minimized is the natural angular frequency of the first oscillation mode.

Furthermore, as shown in FIG. 5B, the axis of abscissas is taken for the driving angular frequency ($2 \cdot \omega_i$), and the axis of ordinate is taken for $B_{2i}$ which is the parameter of the amplitude component of the driving signal. In this case as well, similarly, the driving angular frequency with which the value of $B_{2i}$ is minimized is the natural angular frequency of the second oscillation mode of the oscillation system.

It should be noted that, although the first to third steps should be repeated at least twice, the larger the number of repetitions is, the wider the range of shifting the driving angular frequency is, i.e., the easier the detection of the natural angular frequency is.

Then, a driving signal is generated based on the natural angular frequency of the second oscillation mode, and the oscillation system is driven. Generation of the driving signal itself is as has been described hereinbefore.

First Working Example

The oscillator device of this working example comprises an oscillation system 100 which includes a first oscillator 101, a second oscillator 102, a first torsion spring 111 and a second torsion spring 112, as well as a supporting member 121 for supporting the oscillation system 100. The first torsion spring 111 connects the first oscillator 101 and the second oscillator 102 with each other. The second torsion spring 112 connects the supporting member 121 and the second oscillator 102 with each other so that is has a torsional axis aligned with the torsional axis of the first torsion spring 111.

The oscillator device of this working example further includes a driving member 120 for applying a driving force to the oscillation system, a drive control member for adjusting the driving member, and a photodetector 140 for outputting time moment information as one of the two oscillators takes first and second, different displacement angles.

Furthermore, a reflecting mirror is formed on at least one oscillator. If this oscillator device is used as an optical deflecting device, a light source 131 for emitting a light beam may be provided, so that a light beam 132 is projected to the reflecting mirror provided on the oscillator 101 to perform optical scanning.

The oscillation system 100 is configured to produce, simultaneously, a first oscillation mode moving at a first frequency which is a fundamental frequency and a second oscillation mode moving at a second frequency which is a frequency integral-number multiple of the fundamental frequency.

Namely, the deflection angle θ of the oscillator device of this working example (here, it is measured with reference to the position of the scan center as shown in FIG. 3) is as follows.

If the amplitude and the driving angular frequency of the first oscillation mode are denoted by $A_1$ and ω, respectively, the amplitude and the driving angular frequency of the second oscillation mode are denoted by A2 and 2ω (n=2), respectively, the relative phase difference of the first and the second oscillating motions is denoted by ø, and the time when an appropriate time is taken as the reference time is denoted by t, then the deflection angle can be expressed as follows.

$$\theta(t) = A_1 \sin(\omega t) + A_2 \sin(2\omega t + ø) \quad (3)$$

The driving member 120 comprises a permanent magnet mounted on the oscillator 102, and an electric coil disposed at a distance to apply a driving force to this permanent magnet. A driving signal can be supplied to the coil from the drive control member 150 and, on the basis of a driving signal from the drive control member 150, the driving member 120 applies a driving force to the oscillation system 100.

Furthermore, the drive control member 150 is configured to generate a driving signal with which the oscillation system produce oscillating motion at a fundamental frequency and a frequency twofold the fundamental frequency. In this working example, it applies to the driving member a driving signal which can be expressed by $F(t) = B_1 \sin \omega t + B_2 \sin(2\omega t + \psi)$.

The photodetector 140 measures four time moments, that is, two different time moments whereat, within one period of the first oscillating motion, the oscillator takes the first displacement angle as well as two different time moments whereat the oscillator takes the second displacement angle. If the deflection angle as the oscillator is stationary is denoted by 0 and the absolute value of the largest deflection angle of the oscillator is denoted by 1, the photodetector is disposed at a position 0.8 in terms of the absolute value of the deflection angle of the oscillator.

Figure 4:
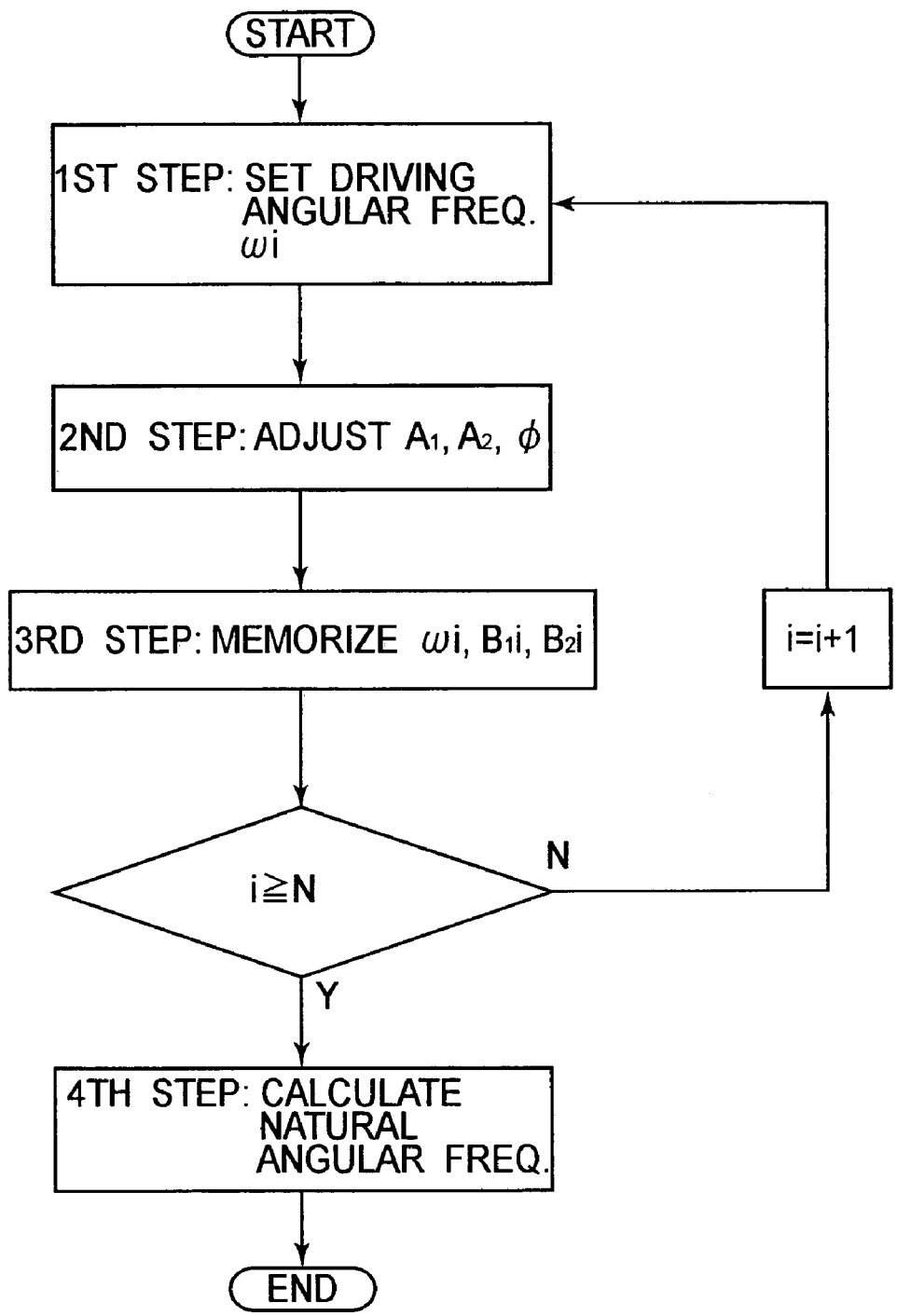
FIG. 4 is a flow chart for calculating the natural angular frequency.

The natural angular frequency calculating member 151 of the drive control member 150 calculates a plurality of natural angular frequencies of the oscillator in accordance with the sequence shown in FIG. 4 and on the basis of the output signal of the photodetector.

At the first step, the driving angular frequency $\omega_i$ of the driving signal is set (i is the number of repetitions, and initially it is 0). The driving angular frequency may preferably be the angular frequency around the natural angular frequency of the first oscillation mode of the oscillation system 100. In this working example, $\omega_0 = 2\pi \times 1998$ (rad/s).

At the second step, the oscillation system is driven with the driving angular frequency $\omega_i$. Here, by supplying a driving signal which is $F(t) = B_1 \sin \omega_i t$, the oscillator is driven to produce oscillation which can be presented by an arithmetic expression including $A_{1i} \sin \omega_i t$.

Furthermore, if a driving signal of $F = B_{1i} \sin \omega_i t + B_{2i} \sin(2\omega_i t + \psi_i)$ is supplied, the oscillator can be driven to produce oscillation expressed by an equation which contains at least a term $A_{1i} \sin \omega_i t + A_{2i} \sin(2\omega_i t + ø_i)$.

In the second step, $B_{1i}$, $B_{2i}$ and $\psi_i$ which are control parameters of the driving signal are adjusted based on the output signal of the photodetector so that $A_{1i}$, $A_{2i}$ and $ø_i$ reach a predetermined value.

At the third step, the values of $B_{1i}$, $B_{2i}$ and $\omega_i$ as $A_{1i}$, $A_{2i}$ and $ø_i$ have reached the predetermined value are memorized.

The first to third steps are repeated ten times. Namely, these are repeated from i=0 to i=9. Here, N=9. In this working example, the driving angular frequency is changed in the range from $\omega_0=2\pi*1998$ (rad/s) to $\omega_9=2\pi*2002.5$ (rad/s).

At the fourth step, from memorized $B_{1i}$, $B_{2i}$ and $\psi_i$ for the ten operations, two natural angular frequencies, that is, the natural angular frequency (first natural angular frequency) of the first oscillation mode and the natural angular frequency (second natural angular frequency) of the second oscillation mode are calculated.

As shown in FIG. 5A, the axis of abscissas is taken for the driving angular frequency ($\omega_i$), and the axis of ordinate is taken for $B_{1i}$ which is the parameter of the amplitude component of the driving signal. In this case, the natural angular frequency of the first oscillation mode is $\omega_4$ since it is the driving angular frequency when $B_{1i}$ of the driving signal becomes a minimum.

Furthermore, as shown in FIG. 5B, the axis of abscissas is taken for the driving angular frequency ($2\cdot\omega_i$), and the axis of ordinate is taken for $B_{2i}$ which is the parameter of the amplitude component of the driving signal. In this case as well, similarly, the driving angular frequency with which the value of $B_{2i}$ is minimized becomes the natural angular frequency of the second oscillation mode of the oscillation system.

From this result, it follows that the natural angular frequency of the first oscillation mode of the oscillation system is $\omega_4=2\pi*2000$ (rad/s) and the natural angular frequency of the second oscillation mode is $2\cdot\omega_8=2\pi*4004$ (rad/s).

In this working example, the natural angular frequency $\omega_4$ of the first oscillation mode and the natural angular frequency $\omega_8$ of the second oscillation mode are approximately in two-fold relationship (around 1.96-2.04 times the fundamental frequency). Here, the reason why the natural angular frequency ($2\cdot\omega_8$) of the second oscillation mode is not exactly twice the natural angular frequency ($\omega_4$) of the first oscillation mode is because there is a processing error in the manufacturing process for producing the oscillation system.

At the time of driving, it is desirable that, while taking into account the natural angular frequency of the first oscillation mode and the natural angular frequency of the second oscillation mode, the oscillation system is driven by the driving angular frequency by which it can be driven most efficiently. Therefore, the driving angular frequency calculation member 152 of the drive control member 150 determines the driving angular frequency $\omega$ in accordance with the equation described below, on the basis of the calculated natural angular frequency $\omega_4$ and $2\cdot\omega_8$.

$$\omega_d=(\omega_4+\omega_8)/2$$

From this equation, it follows that the driving angular frequency in this working example is $\omega_d=2\pi*2001$ (rad/s). The drive control member 150 generates a driving signal based on the driving angular frequency $\omega_d$ determined by the above-described sequence. Thus, the driving signal is:

$$F(t)=B_1 \sin \omega_d t + B_2 \sin(2\omega_d t+\psi)$$

Then, the drive control member 150 adjusts the parameters $B_1$, $B_2$ and $\psi$ of the driving signal so that the oscillation of the oscillator satisfies the following relation:

$$\theta(t)=A_1 \sin(\omega_d t)+A_2 \sin(2\omega_d t+\varnothing)$$

For example, from the angular frequency $\omega_d$ of the driving signal and the relation $\theta(t)=A_1 \sin(\omega_d t)+A_2 \sin(2\omega_d t+\varnothing)$, target values for $A_1$, $A_2$ and $\varnothing$ are determined. The, the timings T1, T12, T2 and T21 satisfying these target values are set, and the parameters $B_1$, $B_2$ and $\psi$ of the driving signal are adjusted so that the oscillator oscillates at these timings.

By adjusting the driving signal in the manner described above, the oscillator device can be controlled very precisely.

Second Working Example

The oscillator device of this working example has a basic structure which is similar to that of the oscillator device of the preceding, first working example. This working example differs from the first working example in the calculation method of the natural angular frequency. This will be explained below.

Figure 8:
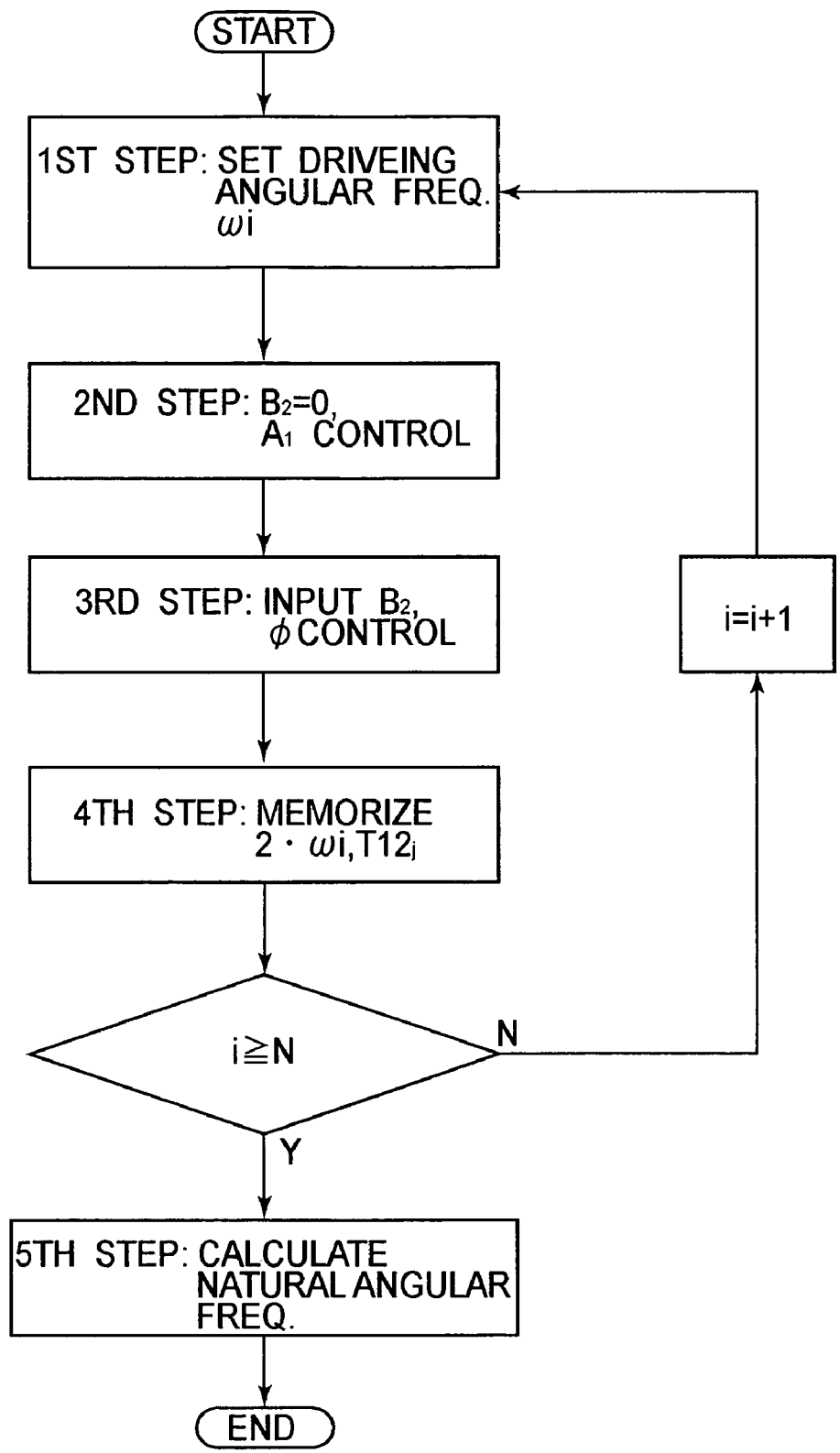
FIG. 8 is a flow chart for calculating the natural angular frequency.

The natural angular frequency calculating member 151 of this working example calculates a plurality of natural angular frequencies of the oscillator in accordance with the sequence shown in FIG. 8 and on the basis of an output signal of the photodetector 140.

At the first step, the driving angular frequency $\omega_i$ of the driving signal is set (i is the number of repetitions, and initially it is 0). The driving angular frequency may preferably be the angular frequency around the natural angular frequency of the first oscillation mode of the oscillation system 100. In this working example, $\omega_0=2\pi\times1998$ (rad/s).

At the second step, the oscillation system is driven with the driving angular frequency $\omega_i$. Here, by supplying a driving signal which is $F(t)=B_1 \sin \omega_i t$, the oscillator is driven to produce oscillation which can be presented by an arithmetic expression including $A_{1i} \sin \omega_i t$.

At this step, $B_{1i}$ is controlled based on the signal of the photodetector 140 so that $A_{1i}$ of the oscillating motion of the oscillator reaches a predetermined value. As shown in FIG. 9, the oscillating motion of $A_{1i} \sin \omega_i t$ is shown by a broken line, and the oscillation passes, four times in one period, the angles $\theta_1$ and $\theta_2$ whereat the photodetector is mounted. Here, since the timing signal from the photodetector is different depending on $A_{1i}$ of $A_{1i} \sin \omega_i t$, the $B_{1i}$ component of the driving signal is controlled so that the timing of the photodetector coincides with a predetermined timing.

At the third step, predetermined $B_2$ is inputted to drive the oscillator to cause oscillation as can be presented by:

$$\theta(t)=A_{1i}\sin(\omega_i t)+A_{2i}\sin(2\cdot\omega_i t+\varnothing_i)$$

Here, the driving signal is:

$$F(t)=B_{1i} \sin \omega_i t + B_{2i} \sin(2\omega_i t+\psi_i)$$

Here, the signal is controlled to make the phase difference ID equal to zero. To this end, $\psi$ of the driving signal is controlled so that t1 and t2 of the solid line which depicts the oscillation of the oscillator of FIG. 9 become equal to each other. This is because, if the phase difference becomes equal to zero, then t1 and t2 become equal to each other.

At the fourth step, the values of $T_{12}$ and the driving angular frequency $2\cdot\omega_i$ as the predetermined $A_{1i}$ and $\varnothing_i$ are reached at the preceding step are memorized. Here, $T_{12}$ is the difference between t3 and t2.

The procedure from the first step to the fourth step is repeated ten times. Namely, the operation is repeated from i=0 to i=9. Here, N=9. In this working example, the frequency is changed in the range from $2\cdot\omega_0=2\pi*3996$ (rad/s) to $2\cdot\omega_9=2\pi*4005$ (rad/s).

At the fourth step, from memorized $T_{12}$ and $2\cdot\omega_i$ for the ten operations, natural angular frequencies are calculated. As shown in FIG. 10, the axis of abscissas is taken for the driving angular frequency ($2\cdot\omega_i$), and the axis of ordinate is taken for the time $T_{12}$ (t3–t2) as detected by the photodetector. Then, the value of $T_{12}$ as well changes with the change of the driving angular frequency. Here, the value of $T_{12}$ is the difference between the time moment t3 and the time moment t2 and, in the oscillator device of the present invention, closer the frequency nears the natural angular frequency, the larger the value of $T_{12}$ is. More specifically, since $T_{12}$ tends to become large if the value of A2 which is the amplitude component of $A_{2i} \sin(2\cdot\omega_i t+\emptyset_i)$ is large, the point where $T_{12}$ shows a maximum provides the natural angular frequency. In this working example, the natural angular frequency of the second oscillation mode is $2\pi*4000$ (rad/s) at the time of $2\cdot\omega_4$.

Similarly, the natural angular frequency can be detected by using $T_{21}$ (t1–t4). The value of $T_{21}$ becomes smaller as the driving angular frequency nears the natural angular frequency of the oscillation system. When the driving angular frequency becomes equal to the natural angular frequency of the oscillation system, the value of $T_{21}$ reaches a minimum. Namely, the value of the driving angular frequency when the value of $T_{21}$ is minimized is the natural angular frequency.

The natural angular frequency calculating member 152 sets the calculated natural angular frequency $2\cdot\omega_4=2\pi*4000$ (rad/s) as the driving angular frequency $\omega_d$.

Then, the drive control member 150 generates a driving signal based on the driving angular frequency $\omega_d$ determined in accordance with the sequence described above. Namely, the driving signal is:

$$F(t)=B_1 \sin \omega_d t + B_2 \sin(2\omega_d t+\psi)$$

Then, the drive control member 150 (parameter B1 of the) adjusts the parameters $B_1$, $B_2$ and $\psi$ of the driving signal so that the oscillation of the oscillator is presented by:

$$\theta(t)=A_1 \sin(\omega_d t)+A_2 \sin(2\omega_d t+\emptyset)$$

By adjusting the driving signal in the manner described above, the oscillator device can be controlled very precisely.

Third Working Example

An image forming apparatus according to a third working example will be explained with reference to FIG. 11.

The optical deflecting device 500 used in the image forming apparatus of this working example is comprised of an oscillator device shown in FIG. 2. The light beam emitted from the light source 510 is shaped by a collimator lens 520 which is an optical system and, after that, it is deflected one-dimensionally by the optical deflecting device 500. The scanning light then passes through a coupling lens 530 which is an optical system, and it is imaged on a photosensitive member 540, whereby an electrostatic latent image is formed thereon. Furthermore, there are two photodetectors 550 disposed at the scan end of the optical deflecting device. The optical deflector 500 calculates the natural angular frequency (resonance frequency) of the oscillator in the manner described with reference to the first and second working examples, and determines the driving signal.

In the image forming apparatus of this working example, the natural angular frequency (resonance frequency) can be calculated only by an output signal of the photodetector 550 which is disposed at the scan end. Then, by driving the optical deflecting device based on two oscillation modes (a first oscillation mode of a reference frequency and a second oscillation mode of a frequency twofold the reference frequency) which are suitable for the image formation, the light beam can be scanned at approximately constant speed. Additionally, a wider effective image drawing region is secured on the other hand.

While the invention has been described with reference to the structures disclosed herein, it is not confined to the details set forth and this application is intended to cover such modifications or changes as may come within the purposes of the improvements or the scope of the following claims.

The invention claimed is:

1. An oscillator device, comprising:
   an oscillation system having a plurality of oscillators and a plurality of torsion springs;
   a driving member configured to drive said oscillation system;
   a drive control member configured to supply a driving signal to said driving member;
   a photodetector configured to receive reflection light of a light beam incident on at least one of said plurality of oscillators; and
   a natural angular frequency calculating member configured to calculate a natural angular frequency of said oscillation system;
   wherein said oscillation system has at least a first oscillation mode and a second oscillation mode, the second oscillation mode having an angular frequency approximately n-fold the angular frequency of the first oscillation mode where n is an integer,
   wherein said driving member is configured to drive said oscillation system so that said oscillation system simultaneously oscillates in the first and second oscillation modes, and
   wherein said natural angular frequency calculating member calculates the natural angular frequency of the second oscillation mode on the basis of an output signal from said photodetector, the output signal being outputted at a timing whereat the reflection light passes over said photodetector while said driving member drives said oscillation system simultaneously in the first and second oscillation modes.

2. An oscillator device according to claim 1, wherein said oscillation system includes a first oscillator, a second oscillator, a first torsion spring configured to connect the first and second oscillators with each other, and a second torsion spring connected to the second oscillator and having a torsion axis aligned with a torsional axis of the first torsion spring.

3. An oscillator device according to claim 1, wherein, when an amplitude of a first oscillation motion is denoted by $A_1$, an amplitude of a second oscillation motion is denoted by $A_2$, an angular frequency is denoted by $\omega$, a relative phase difference between the first and second oscillation motions is denoted by $\emptyset$ and time is denoted by t, said drive control member controls said driving member so that at least one of the first and second oscillators is brought into an oscillation state expressed by an equation which contains a term $A_1 \sin \omega t + A_2 \sin(n\omega t+\emptyset)$ where n is an integer not less than 2 and $A_1>A_2$.

4. An oscillator device according to claim 1, wherein, when an amplitude component of the driving signal is denoted by $B_1$ and $B_2$, an angular frequency is denoted by $\omega$, a relative phase difference is denoted by $\psi$ and time is denoted by t, said drive control member supplies a driving signal expressed by an equation which contains a term $B_1 \sin \omega t + B_2 \sin(n\omega t+\psi)$ where n is an integer not less than 2.

5. An oscillator device according to claim 1, wherein said natural angular frequency calculating member calculates the natural angular frequency of the first oscillation mode on the basis of an output signal from said photodetector, the output signal being outputted at a timing whereat the reflection light passes over said photodetector.

6. An oscillator device according to claim 1, wherein said drive control member determines the driving signal based on at least one of the first and second natural angular frequencies calculated by said natural angular frequency calculating member.

7. An oscillator device according to claim 1, wherein, when a scan center as the oscillator is stationary is denoted by 0 and an absolute value of a maximum scan angle of reflection light reflected by the oscillator is denoted by 1, said photodetector is disposed in a scan-angle absolute value range not less than 0.6 and not greater than 1.0.

8. An oscillator device according to claim 1, wherein at least one of the first and second oscillators takes a first displacement angle and a second displacement angle, and wherein the output signal of said photodetector contains first time-moment information and second time-moment information, different from each other, corresponding to the first displacement angle and further contains third time-moment information and fourth time-moment information corresponding to the second displacement angle.

9. An image forming apparatus, comprising:
an optical deflecting device including an oscillator device as recited in claim 1;
an optical system; and
a photosensitive member;
wherein a light beam from said light source is scanningly deflected by said optical deflecting device such that an electrostatic latent image is formed on said photosensitive member.

10. An oscillator device according to claim 1, wherein said natural angular frequency calculating member calculates the natural angular frequency of the first oscillation mode on the basis of an output signal from said photodetector, the output signal being outputted at a timing whereat the reflection light passes over said photodetector while said driving member drives said oscillation system simultaneously in the first and second oscillation modes.

11. A method of controlling an oscillator device which includes an oscillation system having a plurality of oscillators and a plurality of torsion springs, a driving member configured to drive the oscillation system, a drive control member configured to supply a driving signal to the driving member, a photodetector configured to receive reflection light of a light beam incident on at least one of the plurality of oscillators, and a natural angular frequency calculating member configured to calculate a natural angular frequency of the oscillation system, the oscillating system having a first oscillation mode with an angular frequency and a second oscillation mode with an angular frequency approximately N-fold the angular frequency of the first oscillation mode, where N is an integer, said method comprising:
a first step for determining a driving angular frequency $\omega_i$ where i is the number of repetitions, for driving the oscillation system;
a second step for driving the oscillation system with a driving angular frequency $\omega_i$ and a driving angular frequency $n \cdot \omega_i$ where n is an integer not less than 2;
a third step for memorizing at least one of the driving angular frequency $\omega_i$ and the driving angular frequency $n \cdot \omega_i$ and information related to the oscillating motion of the oscillation system outputted from the photodetector; and
a fourth step for repeating said first to third steps at least twice and for calculating a natural angular frequency of the second oscillation mode of the oscillation system on the basis of at least one of the driving angular frequency $\omega_i$ and the driving angular frequency $n \cdot \omega_i$ memorized at said third step as well as the information related to the oscillating motion of the oscillation system.

12. A method according to claim 11, further comprising generating a driving signal for driving the oscillation system, based on the natural angular frequency of the second oscillation mode calculated by said fourth step.

13. A method according to claim 11, wherein in said second step, after the oscillation system is driven by an angular frequency $\omega_i$, the oscillation system is driven by a driving angular frequency w, and a driving angular frequency $n \cdot \omega_i$ where n is an integer not less than 2.

14. A method according to claim 11, wherein, when an amplitude of a first oscillation motion is denoted by $A_{1i}$, an amplitude of a second oscillation motion is denoted by $A_{2i}$, an angular frequency is denoted by $\omega_i$, a relative phase difference between the first and second oscillation motions is denoted by $\emptyset_i$ and time is denoted by t, said second step is a process for supplying a driving signal to the driving member to produce oscillation of the oscillator expressed by an equation which contains a term $A_{1i} \sin \omega_i t + A_{2i} \sin(n\omega_i t + \emptyset_i)$ where n is an integer not less than 2 and $A_{1i} > A_{2i}$.

15. A method according to claim 11, wherein, when an amplitude component of the driving signal is denoted by $B_{1i}$ and $B_{2i}$, an angular frequency is denoted by $\omega_i$, a relative phase difference is denoted by $\psi_i$ and time is denoted by t, said second step is a process for driving the oscillation system by a driving signal which is expressed by an equation $F(t) = B_{1i} \sin \omega_i t + B_{2i} \sin(n\omega_i t + \psi_i)$.

16. A method according to claim 15, wherein said second step is a process for adjusting $B_{1i}$, $B_{2i}$ and $\psi_i$ of the driving signal so that $A_{1i}$, $A_{2i}$ and ø of the oscillator take a predetermined value, wherein said third step is a process for memorizing $B_{1i}$, $B_{2i}$ and $\psi_i$ with respect to $\omega_i$, and wherein said fourth step is a process for repeating said first to third steps at least twice and for calculating a natural angular frequency of the second oscillation mode of the oscillation system in a torsional axis direction, based on the $B_{1i}$, $B_{2i}$ and $\omega_i$ memorized at said third step.

* * * * *